US012645210B2

(12) United States Patent
Kontaxakis

(10) Patent No.: US 12,645,210 B2
(45) Date of Patent: Jun. 2, 2026

(54) SYSTEM AND METHOD FOR CONTROLLING A MOBILE INDUSTRIAL ROBOT USING A PROBABILISTIC OCCUPANCY GRID

(71) Applicant: ABB Schweiz AG, Baden (CH)

(72) Inventor: Polychronis Kontaxakis, Västerås (SE)

(73) Assignee: ABB Schweiz AG, Baden (CH)

( * ) Notice: Subject to any disclaimer, the term of this patent is extended or adjusted under 35 U.S.C. 154(b) by 419 days.

(21) Appl. No.: 18/246,223

(22) PCT Filed: Sep. 25, 2020

(86) PCT No.: PCT/EP2020/076949
§ 371 (c)(1),
(2) Date: Mar. 22, 2023

(87) PCT Pub. No.: WO2022/063411
PCT Pub. Date: Mar. 31, 2022

(65) Prior Publication Data
US 2023/0359186 A1 Nov. 9, 2023

(51) Int. Cl.
*G05B 19/00* (2006.01)
*G05B 19/418* (2006.01)

(52) U.S. Cl.
CPC . *G05B 19/41895* (2013.01); *G05B 19/41885* (2013.01)

(58) Field of Classification Search
CPC ........ G05B 19/41895; G05B 19/41885; G01C 21/206; G01C 21/005; G01S 13/881;
(Continued)

(56) References Cited

U.S. PATENT DOCUMENTS

2017/0197311 A1 7/2017 Garcia et al.
2017/0329008 A1 11/2017 Walessa
(Continued)

FOREIGN PATENT DOCUMENTS

WO 2020061062 A1 3/2020

OTHER PUBLICATIONS

International Search Report and Written Opinon of the International Searching Authority; Application No. PCT/EP2020/076949 ; Completed: Jun. 9, 2021; Mailing Date: Jun. 17, 2021; 14 Pages.

*Primary Examiner* — Aleksey Olshannikov
(74) *Attorney, Agent, or Firm* — Whitmyer IP Group LLC

(57) ABSTRACT

A robot movable on a substrate is controlled on the basis of an occupancy grid of cells, where each cell is associated with an occupancy probability that some physical object is present in the cell. Occupancy-related measurements are obtained by RGB-D, radar or other sensing of an incident electromagnetic wave at an elevated point on the robot. From a measurement taken at an angle of incidence, an occupancy probability is assigned as follows: it is evaluated whether the measurement indicates that some physical object is present in the angle of incidence; a first predetermined model is selected if the evaluation is positive, and second predetermined model if the evaluation is negative; and a new occupancy probability for cells in the angle of incidence is determined on the basis of the measurement and the selected model.

12 Claims, 3 Drawing Sheets

(58) Field of Classification Search
CPC .. G01S 17/931; G05D 1/0248; G05D 1/0274;
G06V 20/52
See application file for complete search history.

(56) References Cited

U.S. PATENT DOCUMENTS

| | | | |
|---|---|---|---|
| 2017/0344007 A1* | 11/2017 | Song | G05D 1/0217 |
| 2018/0188059 A1* | 7/2018 | Wheeler | G06T 17/05 |
| 2018/0267540 A1* | 9/2018 | Sonoura | B60W 60/0016 |
| 2020/0264626 A1* | 8/2020 | Wang | G05D 1/0274 |
| 2020/0341486 A1* | 10/2020 | Dia | G05D 1/0238 |
| 2022/0057232 A1* | 2/2022 | Shen | G01S 17/89 |

* cited by examiner

SYSTEM AND METHOD FOR CONTROLLING A MOBILE INDUSTRIAL ROBOT USING A PROBABILISTIC OCCUPANCY GRID

TECHNICAL FIELD

The present disclosure relates to the field of robot navigation and, in particular, to methods and devices for controlling a mobile industrial robot on the basis of a probabilistic occupancy grid representing a substrate on which the robot can move.

BACKGROUND

Significant research has been and is being devoted to the problem of developing perception mechanisms for supporting control systems in mobile industrial robots. A satisfactory perception mechanism should enable the robot to navigate constrained and populated environments efficiently, while at the same time avoiding destructive collisions. For this purpose, many regard sensor fusion as a promising approach, wherein information captured using different sensor technologies or different measuring principles is combined. Such combining is likely to improve the robot's discovery and correct assessment of difficult obstacles, including objects at different heights, objects with small dimensions, transparent or reflective objects, dark or black objects.

For example, US20170197311A1 describes a method for building a probability map of absence or presence of obstacles in a navigable environment of an autonomous robot. A probability map is initialized with predefined values of a probability of the absence or presence of an obstacle, and the values are then updated based on acquired data from at least one sensor type, such as a lidar, a three-dimensional camera, an ultrasonic sensor or contact sensors mounted on the robot.

The problem of updating such a probability map based on a sequence of sensor measurements from a moving platform is discussed in a preprint by Chr. Robbiano et al., "Bayesian Learning of Occupancy Grids", retrieved from arxiv.org/abs/1911.07915.

Particularly addressing an indoor mobile robot application where the navigable environment is modeled by a two-dimensional occupancy grid, the present disclosure aims to refine and improve the prior art techniques.

SUMMARY

One objective is to make available methods and devices for providing an occupancy grid to support the controlling of a mobile industrial robot. Another objective is to enable maintenance and successive refinement of such occupancy grid on the basis of continuing measurements by a sensor at an elevated point on the robot. A particular objective is to propose efficient data processing techniques suited for use cases where RGB-D (red-green-blue plus depth, i.e., color image and depth map) measurements or millimeter-wave radar measurements, or both, are available.

These and other objectives are achieved by the method and robot controller according to the invention defined by the independent claims. The dependent claims are directed to embodiments of the invention.

In a first aspect, a method for controlling an industrial robot movable on a substrate comprises: initializing an occupancy grid of cells which each represents a portion of the substrate and is associated with an occupancy probability that some physical object is present in the cell; obtaining occupancy-related measurements using at least one measuring principle that includes sensing an incident electromagnetic wave at an elevated point on the robot; assigning an occupancy probability on the basis of an obtained occupancy-related measurement at an angle of incidence S; and controlling the industrial robot on the basis of the occupancy grid. According to an embodiment of the invention, the assigning step includes evaluating whether the measurement indicates that some physical object is present in the angle of incidence, selecting a first predetermined model if the evaluation is positive and selecting a second predetermined model if the evaluation is negative, and determining a new occupancy probability for cells in the angle of incidence on the basis of the measurement and in accordance with the selected model.

The use of dual models for determining the new occupancy probability has proved advantageous. More precisely, the measurement data can be processed in two independently configurable ways depending on whether the measurement predominantly indicates that an object is present or not.

In a second aspect, there is provided a robot controller for controlling at least one mobile industrial robot. The robot controller comprises an input interface, processing circuitry and output interface and it is configured to perform the above method.

The invention further relates to a computer program containing instructions for causing a computer, or the robot controller in particular, to carry out the above method. The computer program may be stored or distributed on a data carrier. As used herein, a "data carrier" may be a transitory data carrier, such as modulated electromagnetic or optical waves, or a non-transitory data carrier. Non-transitory data carriers include volatile and non-volatile memories, such as permanent and non-permanent storages of magnetic, optical or solid-state type. Still within the scope of "data carrier", such memories may be fixedly mounted or portable.

As used herein, an "angle" may be a planar angle (e.g., direction, unit: 1 radian) or a solid angle (e.g., sensor's field of view, frustum; unit: 1 steradian). The specific term "angle of incidence" includes not only the size/measure of the angle that the sensor covers but also the current orientation of the sensor. The orientation may be expressed with respect to a frame of reference that is stationary with respect to the sensor.

As used herein, a "measurement" includes the measured quantity as well as indications relating to the measuring process as such, e.g., noisiness, quality, accuracy.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, on which.

DETAILED DESCRIPTION

The aspects of the present disclosure will now be described more fully hereinafter with reference to the accompanying drawings, on which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 2:
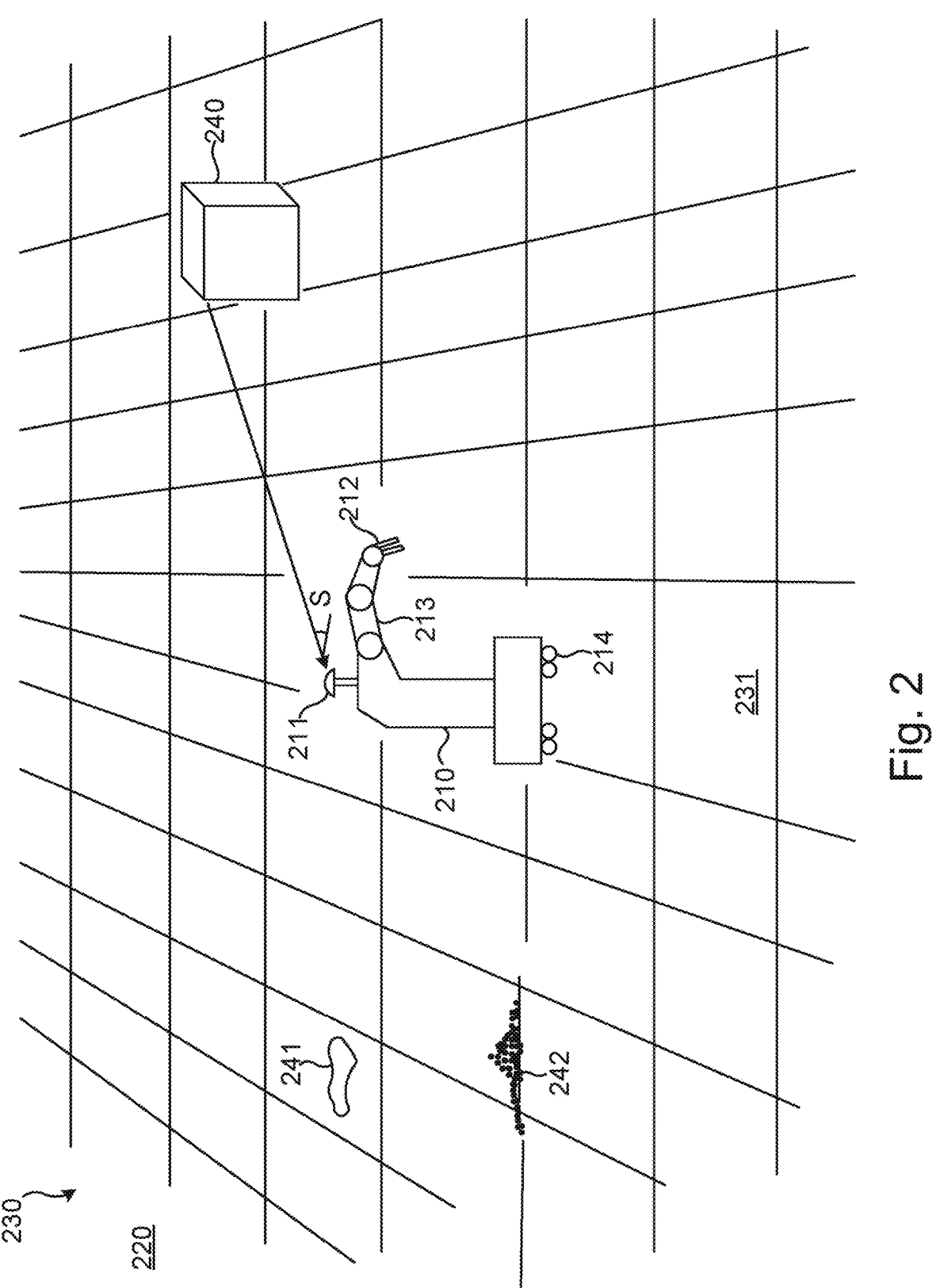
FIG. 2 is a perspective view of an industrial robot adapted to move on a substrate, modeled as a two-dimensional occupancy grid, and objects thereon representing potential obstacles to the robot's movement.

FIG. 2 depicts a setting where the present invention may be applied. Here, an industrial robot 210 is movable over a substrate 220 by means of wheels 214, bands, claws, movable suction cups or other means of propulsion and/or attachment. The substrate 220 may be a planar or curved surface with a horizontal, slanted or vertical orientation; it may optionally be provided with rails or other movement guides adapted to cooperate with the robot 210. Example substrates 220 include an indoor floor, outdoor ground, a surface preconditioned to facilitate driving etc. Present are furthermore physical objects which may act as obstacles of different seriousness to the robot's 210 movement over the substrate 220. To exemplify, FIG. 2 shows a box-shaped object 240 comparable to the robot's 210 height, a puddle of liquid 241 and a moderately sized heap of powdery material 242. From these, the puddle of liquid 241 will normally not impede the robot's 210 movement and may therefore be treated as a non-obstacle.

The bookkeeping of obstacles relies on an occupancy grid 230, a data structure which associates each of the multiple cells 231 of the grid with an occupancy probability p. An occupancy probability of a cell at grid indices (x, y) may be denoted p(x, y). The resolution of the grid may be expressed as a cell size parameter $w_{res}$, which may be of the order of 0.01 m to 1 m, such as 0.05 m, 0.10 m or 0.20 m. For navigation of relatively slower-moving and sensitive robots 210, a smaller cell size is preferable. In the present disclosure, unless otherwise indicated, grid indices (x, y) refer to the discretized grid at resolution $w_{res}$. The grid indices may for example be represented as integer pairs, and real-valued cartesian coordinates (X, Y, Z) (which may have been read from a sensor) may be converted into grid indices (x, y) by orthogonal projection on the Z=0 plane (corresponding to the substrate 220) combined with a rounding operation. The grid indices may optionally be extended with a height index z into an integer triplet (x, y, z). In this disclosure, uppercase letters are preferred for coordinates and lowercase letters for grid and height indices.

The present disclosure will rely on ordinary terminology and the commonly embraced theoretical basics of occupancy grids. In particular, an occupancy probability of a cell may be understood as the posterior probability that a physical object is present in the cell. The highest likelihood that a physical object is present corresponds to the value p=1. Cells with occupancy probability values in the range (0.5,1.0] may be treated as occupied cells, and cells with values in [0.0,0.5) may be taken to be free. The occupancy grid 230 is a probabilistic representation that goes beyond the binary distinction occupied/free and thereby enables sensor fusion, as discussed above, and the nuanced combining of multiple measurements by a single sensor. The occupancy probability is uniform or model-agnostic in the sense that it may have been produced or partially produced by the first predetermined model (for the case of a measurement predominantly suggesting that the cell is occupied) or the second predetermined model (for the case of a measurement predominantly suggesting that the cell is free). In some embodiments, an alternative occupancy grid is used where each cell is associated with a probability (a 'non-occupancy probability') p' that the cell is free, i.e., no physical object is present. This means that the highest likelihood that a physical object is present corresponds to the value p'=0.

The robot 210 is shown equipped with a movable arm 213, end effector 212 and sensor 211. The sensor may be elevated, i.e., located some distance above the level of the substrate 220 to make efficient use of its field of view. The sensor 211 may be configured to employ at least one measuring principle that includes sensing an incident electromagnetic wave reflected or emitted by the objects 240, 241, 242 on the substrate 230 or the substrate 230 itself. To exemplify, an incident ray from the box 240 is shown in FIG. 2. The measuring principle may be one or more of optical, electromagnetic reflection, electromagnetic scattering, electromagnetic diffraction, lidar, RGB-D sensing, mm-wave radar, ultra-wideband radar (UWB). Alternatively, the sensor 211 may be acoustic. In FIG. 2, the symbol S denotes an angle of incidence in the sense discussed above. The sensor 211 may have an angle of incidence S which is variable as regards its extent and/or its orientation.

Figure 3:
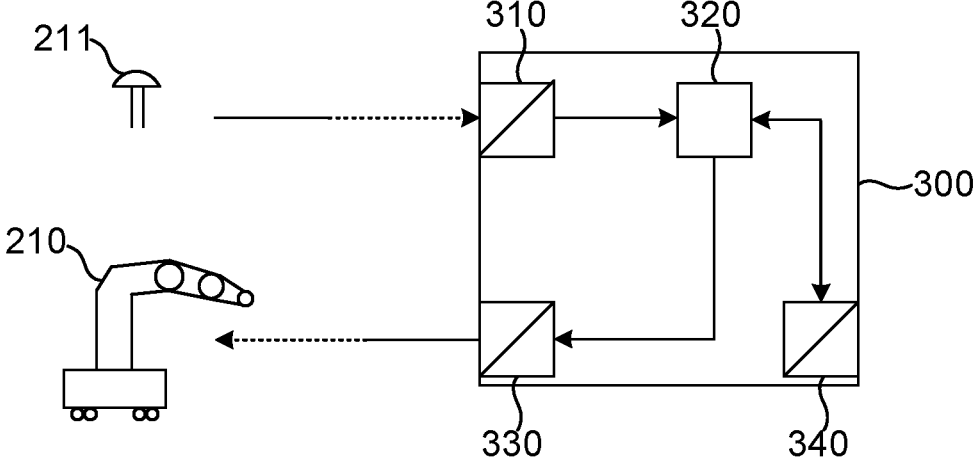
FIG. 3 is a block diagram of a robot controller according to an embodiment.

FIG. 3 is a schematic representation of a robot controller 300 suitable for controlling the robot 210 of FIG. 2. The robot controller 300 may be integral with the robot 210 or may be implemented as a separate, stationary or mobile unit. It comprises an input interface 310 configured to receive occupancy-related measurements obtained by the sensor 211 on the robot, processing circuitry 320 configured to assign an occupancy probability on the basis of the received occupancy-related measurements, an output interface 330 for supplying commands to the robot 210, as well as an operator interface 340. The interfaces 320, 340 and processing circuitry 320 may be local resources or networked (or cloud) resources; in particular, the processing circuitry 320 may include one processor or multiple processors. The operator interface 340 may be a text-based, graphical, auditory and/or haptic interface, by which the robot controller 300 may receive instructions directing on high level the commands to be fed to the robot 210, and by which it may output human-intelligible information indicative of a state or condition of the robot 210. FIG. 3 furthermore indicates an example set of communicative connections (data connections) among the internal functional components 310, 320, 330, 340 of the robot controller 300. Alternatively, the connections may be implemented as a central bus providing multipoint connectivity.

Figure 1:
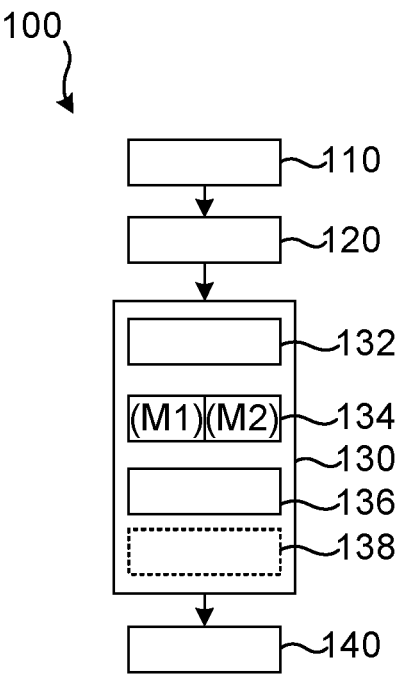
FIG. 1 is a flowchart of a method according to an embodiment.

To establish and maintain the occupancy grid, the robot controller 300 may perform the method 100 depicted in FIG. 1.

In a first step 110, the occupancy grid is initiated. It may take into account the geometry of the substrate 220 and a configured value of the cell size $w_{res}$. The initiation may further include assigning a neutral/unknown occupancy probability (e.g., p=0.5) to all cells 231 of the occupancy grid 230. Alternatively, a specific placeholder value may be assigned, so as to signify that the occupancy probability has not yet been updated in view of an occupancy-related measurement.

In a second step 120, occupancy-related measurements are obtained using the robot-carried sensor 211 shown in FIG. 2. Each measurement includes data representing the measured quantity but may also contain indications describing the measuring process as such, e.g., noisiness, quality, accuracy, irregularities.

A third step 130 of the method 100 comprises multiple substeps where the measurement is processed with the ultimate aim of determining a new occupancy probability to some cells 231 in the occupancy grid 230. This may include adjusting or gradually refining the neutral or placeholder values assigned in the initiation step 110 using the occupancy-related measurement as guidance.

In a first substep 132 of the third step 130, it is evaluated whether the measurement indicates that some physical object is present in the angle of incidence S. Put differently, it is evaluated whether some physical object is present in any of the cells that overlap (by at least a predetermined percentage, such as 50%) with the orthogonal projection of the angle of incidence S. The evaluation is meaningful as long as the elevation (e.g., defined as the angle between the substrate 220 and the line of sight of the sensor 211) of the angle of incidence is moderate; if a measurement is captured at such angle of incidence S that the lower boundary of the sensor's 211 field of view is above the height of expected obstacles in the remotest measurable areas of the substrate 220, this measurement may be disregarded. It is remarked that while the output of successful completion of this substep 132 is binary (object present/absent), it will form the basis of the assignment of an occupancy probability anywhere in the real interval [0,1] or a digital representation thereof. The resolution of the evaluation in substep 132 may be the full sensor frustum or a sub-interval of angles of incidence. For example, if a sub-interval $S_1$ of the sensor frustum S is obscured by a physical object, then the evaluation may be positive for $S_1$ and negative for the complement $S \backslash S_1$.

Assuming that it can be determined whether some physical object is present in the angle of incidence S, the execution of the third step 130 moves on to the second substep 134, which selects a first predetermined model M1 if the determination was positive (objects are likely present) and a second predetermined model M2 if the determination was negative (objects are likely absent). For a given cell in the angle of incidence S, a single one of the predetermined models M1, M2 is selected; in an execution of the third step 130, each cell is updated on the basis of either model, not both.

In the third substep 136, then, a new value $p_{new}$ of the occupancy probability for cells in the angle of incidence S is determined on the basis of the measurement and in accordance with the selected first or second predetermined model. It is noted that each of the predetermined models M1, M2 may be adaptive in the sense that different processing is foreseen for different measuring principles, as exemplified below.

If a pre-existing value $p_{old}(x, y)$ of the probability for a cell at grid indices (x, y) in the angle of incidence S exists, an optional fourth substep 138 of merging the new occupancy probability $p_{new}(x, y)$ and the pre-existing one may be executed. For this purpose, a recursive rule, as Bayes' rule, may be applied. The merging may proceed as follows:

6

$$p_{merged}(x, y) = \frac{p_{old}(x, y)p_{new}(x, y)}{p_{old}(x, y)p_{new}(x, y) + [1 - p_{old}(x, y)][1 - p_{new}(x, y)]}.$$

If no pre-existing value exists, the new value determined in substep 136 is adopted.

After completion of the third step 130 of the method 100, the robot controller 300 may execute a fourth step 140, in which the industrial robot 310 is controlled on the basis of the occupancy grid. Such controlling may include local motion planning, tactical route planning, collision avoidance, speed regulation and similar tasks.

Figure 4:
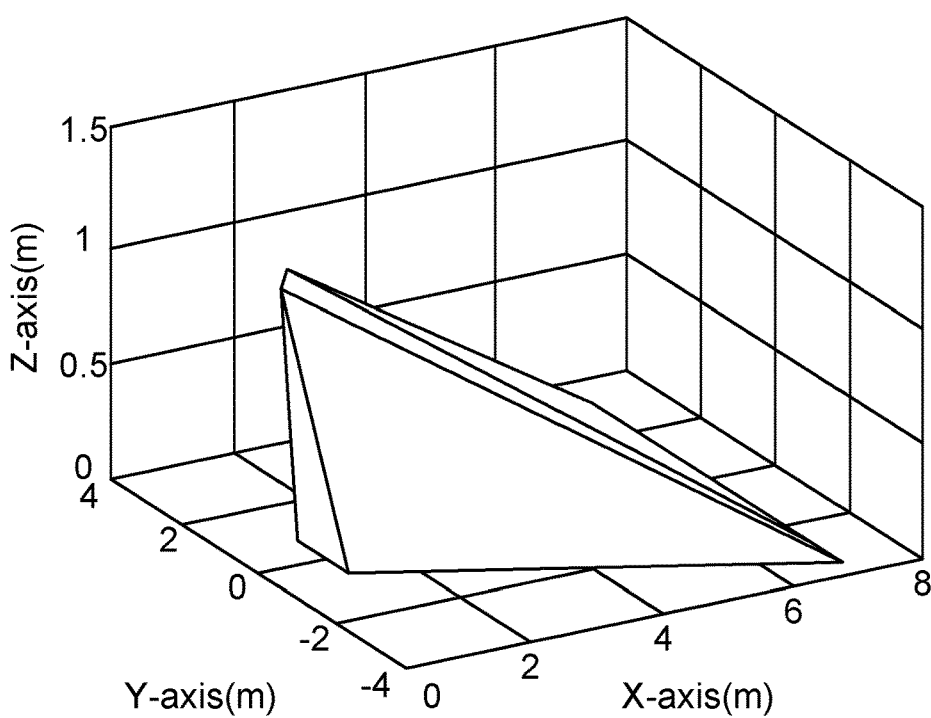
FIG. 4 shows an RGB-D camera frustrum oriented slightly downwardly.

With reference to FIG. 4, the first and second predetermined models M1 and M2 will now be exemplified in the special case where the sensor 211 is or includes an RGB-D sensor. An RGB-D sensor may produce a two-dimensional color bitmap, where at least some pixels are annotated with depth values, representing an image plane orthogonal to the orientation of the angle of incidence S. Alternatively, the RGB-D sensor may produce a point cloud, where each point is represented in three-dimensional coordinates (e.g., cartesian, spherical, radial) and additionally carries a color or chromaticity value. RGB-D sensors are commercially available and easy to integrate. Since however the color information is not relied upon in the processing to be described below, a sensor producing a two-dimensional monochrome or grey-tone bitmap with associated depth information shall be considered equivalent to an RGB-D sensor.

In the coordinate system shown in FIG. 4, the RGB-D sensor 211 is located at coordinates $(X_a, Y_a, Z_a)=(0,0,1)$ and is aimed approximately at (4,0,0), so that a region of the substrate 220 surrounding that point is imaged together with any objects present thereon. The conical region C(S) represents the sensor's 211 frustum (field of view) at an angle of incidence S. For purposes of the robot controller 300 described herein, it may be suitable to disregard depth values or point cloud points that are further away than a predetermined cutoff distance $r_0$ from the sensor 211, where the measurements may be less reliable. The cutoff distance may be of the order of meters or tens of meters. For a sensor 211 with a frustum C(S) as wide as illustrated in FIG. 4, a cutoff distance of $r_0$=8 m will exclude depth values only when the sensor's 211 frustum is rotated (pitched) upwards from the position shown, so that it approaches a horizontal orientation where the upper boundary of the frustum reaches beyond the line (X,Z)=(8,0).

For the RGB-D sensor, the first predetermined model M1 (positive evaluation in substep 132) may be defined as follows in one embodiment. It is assumed that the RGB-D sensor is located at $(X_a, Y_a, Z_a)$ and a physical object is detected at $(X_b, Y_b, Z_b)$, corresponding to a cell with grid indices $(x_b, y_b)$. Detecting a physical object with an RGB-D sensor may correspond to obtaining a depth (D) value less than the cutoff distance $r_0$. The new probability is given by $$M1_{RGB}: p_{new}(x, y) = \begin{cases} 0.8 & \text{if } (x, y) = (x_b, y_b) \\ p_1(x, y) & \text{if } (x, y) \in L_{ab} \end{cases}$$

where $L_{ab}$ is the set of grid indices of all cells intersecting the line segment from $(X_a, Y_a, 0)$ to $(X_b, Y_b, 0)$ on the substrate 220, and the function $p_1$ may be defined as $$p_1(x, y) = \frac{1}{2}\left(1 - \frac{|\{(X, Y, Z): X = x, Y = y, Z \geq 0\} \cap C(S)|}{Z_a}\right).$$

Here, |•| denotes measure, and the point set {(X, Y, Z):X=x, Y=y, Z≥0}∩C(S) is clearly a vertical line segment contained inside the frustum C(S) above the grid cell (x, y). Accordingly, the second term represents the ratio between the local vertical thickness of the frustum C(S) and the sensor height $Z_a$. Direct inspection shows that $p_1$ will tend to the neutral value 0.5 in incompletely covered grid cells and decrease to zero (i.e., cell is likely free) for grid cells well covered by the frustum C(S). The dependence on the thickness is linear.

In a discretized representation, where the three-dimensional navigation space is divided into cubic cells (voxels) of length $w_{res}$, the function $p_1$ may be implemented as follows:

$$p_1(x, y) = \frac{1}{2}\left(1 - \frac{w_{res}}{Z_a}\sum_{t=z_{min}(x,y)}^{z_{max}(x,y)} 1\right)$$

where $z_{min}(x, y)$ is the height index of a lowest cubic cell inside the frustum C(S) at grid indices (x, y) and $Z_{max}(x, y)$ is the height index of a highest cubic cell inside the frustum C(S). Accordingly, the summation counts the number of cubic cells contained inside the frustum at grid indices (x, y) in the vertical dimension. This number is compared to the number $Z_a/w_{res}$ of stacked cubic cells needed to reach the sensor height $Z_a$, in the same manner as described in the preceding paragraph.

In a variation of this embodiment, the constant value P($x_b$, $y_b$)=0.8 may be modified by a correction term or correction factor which accounts for a measuring uncertainty. The measuring uncertainty may vary across different regions of the substrate 220 or depending on conditions in which the RGB-D measurement was made.

In a further variation, the numerator in the expression $$\frac{|\{(X, Y, Z): X = x, Y = y, Z \geq 0\} \cap C(S)|}{Z_a}$$

may be extended by a weighting operating that gives relatively more weight to positions closer to the substrate 220. This reflects an assumption that the expected obstacles have a height variation, so that the information gained by searching the navigation space at lower height (smaller Z) is relatively more useful for obstacle avoidance than by searching higher up. The dependence on the thickness is nonlinear.

Still referring to an RGB-D sensor, the second predetermined model M2 (negative evaluation in substep 132) may be defined as follows in one embodiment. It is assumed that the RGB-D sensor is located at ($X_a$, $Y_a$, $Z_a$) and oriented in the angle of incidence S and that no physical object is detected. Then, $$M2_{RGB}: p_{new}(x,y)=p_1(x,y)$$

for all cells in a solid angle of incidence S and with $p_1$ defined (and implemented) in the manner described above. Accordingly, the new occupancy probability in cells in a solid angle of incidence S shall be in a positive relation to a local vertical thickness of the solid angle, i.e., a thickness of the frustum C(S) for that angle S.

As explained above, the new probability value $p_{new}$ may be combined with an existing one $p_{old}$ into a merged value $p_{merged}$ which is assigned as the occupancy probability of a cell in the occupancy grid.

Figure 5:
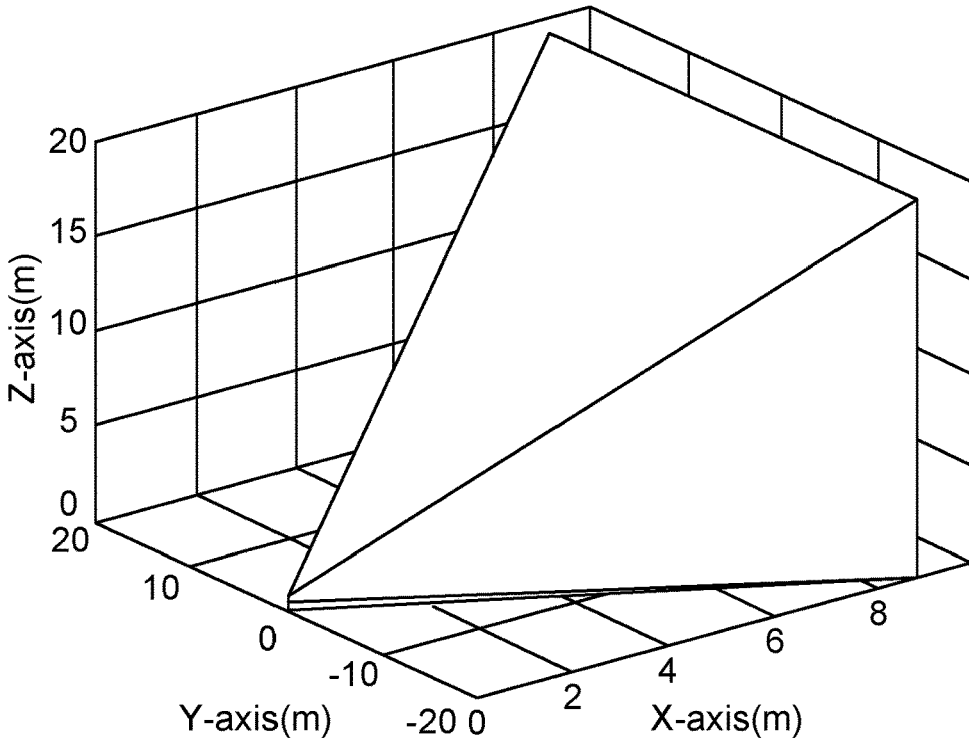
FIG. 5 shows a three-dimensional radar frustum oriented horizontally.

With reference now to FIG. 5, radar measurements, in particular three-dimensional millimeter-wave and ultra-wideband radar measurements, will be discussed next. Radars of these respective types may operate anywhere in the millimeter-wavelength range, such as around 60 GHz or around 80 GHz, and in the ultra-wideband range, such as around 24 GHz. FIG. 5 shows a frustum C(S) of a radar sensor 211, which is mounted to a chassis of the robot 210 with an approximately horizontal orientation. While the figure includes cartesian coordinate axes (X, Y, Z), some of the calculations to be presented refer to a local system in polar coordinates (r, θ, φ), where r is the distance from the sensor 211 and the line (θ, φ)=(0,0) corresponds to the center line of the radar's field of view at each time. Transformations between the local sensor system and the cartesian system are possible if the angle of incidence S is known; equivalence under such transformation is denoted (X, Y, Z)~(r, θ, φ)$_s$. Similarly, a transformation between the local sensor system and grid indices is possible as long as the angle of incidence S is known, and it will be written, as the case may be, (x, y)~(r, θ, φ)$_s$ or (x, y, z)~(r, θ, φ)$_s$.

When the robot-mounted sensor 211 is or includes a radar, the first predetermined model M1 may include the following operations. If a radar reflection is detected above a cell with grid indices ($x_b$, $y_b$), then the new occupancy probability is given by $$M1_{radar}: p_{new}(x_b, y_b) = P_{fa}^{\frac{1}{1+SNR}}$$

where $0<P_{fa}\ll 1$ and SNR denotes the signal-to-noise ratio (SNR) or signal-to-interference-plus-noise ratio (SINR) of that measurement. One may for example set $P_{fa}=10^{-3}$. The SNR and SINR are inversely proportional to the noisiness of the signal. The first predetermined model M1 for the radar case produces a new probability only for the grid cells where the reflection is detected somewhere in the field of view.

Turning to the case where the radar detects no reflection, an assignment of the occupancy probability similar to the one described for the RGB-D sensor is used. For the radar case, the inventor has realized that the end accuracy is improved if a pre-correction factor P(x, y, z) is introduced:

$$M2_{radar}: p_{new}(x, y) = p_2(x, y) = \frac{1}{z_{max}(x, y) - z_{min}(x, y)}\sum_{t=z_{min}(x,y)}^{z_{max}(x,y)} P(x, y, t)$$

where $$P[(x, y, z)\sim(r, \theta, \phi)_S] = \frac{1}{2} - \left(\frac{1}{2} - P_{fb}\right)\exp\left(-\frac{1}{2}\left(\frac{r^2}{r_0^2} + \frac{\theta^2}{\theta_0^2} + \frac{\phi^2}{\phi_0^2}\right)\right)$$

with constants $r_0$, $\theta_0$, $\phi_0$, $P_{fb}$. For cells on the center line of the radar's field of view, the pre-correction factor P(x, y, z) is equal to $P_{fb}$, while for cells in off-center positions, where the measurement is less reliable, the factor P(x, y, z) will tend to the neutral value 0.5. In other words, the pre-correction factor P(x, y, z) tends to maintain the new occupancy probability in off-center cells closer to the neutral probability. The expression $P_2(x, y)$ may be understood as an average over the cubic grid cells at indices (x, y) which lie inside the frustum C(S). Cubic grid cells that are off-center will contribute neutral or near-neutral probability values to the average; if this holds for the majority of the grid cells, the occupancy status of the corresponding grid cell will remain uncertain.

9                                                                                       10

The constants $r_0$, $\theta_0$, $\phi_0$ define the useful field of view (energy lobe) of the radar, in a similar manner as the cutoff distance $r_0$ for the RGB-D sensor, though with a gradual decrease rather than a sharp cutoff. The constants may be assigned in view of known characteristics and performance of the sensor hardware to be used, as may be read from a manufacturer's datasheet. Example values for a 60 GHz sensor, which is commercially available at the priority date and has an approximate range of 10 m, are $r_0$=7 m, $B_0$=40°, $\phi_0$=40°.

The constant $P_{fb}$>0 may be set to a value less than 0.5 and may reflect the perceived certainty of the radar measurement. In a use case where the millimeter-wave or UWB radar is operated alongside with another measuring principle, the liberty of assigning an exact value to $P_{fb}$, may be utilized for relative tuning of the two measuring principles, to render these consistent as data sources. In the concrete case of the RGB-D sensor discussed above, evaluating the discretized implementation of $M1_{RGB}$ for $w_{res}$=0.05 m and $Z_a$=1.3 m gives $p_{new}(x, y)$=0.4808. Accordingly, one may set $P_{fb}$=0.4808.

The predetermined first and second models M1 and M2 may be expressed as models which are adaptive in dependence of the measuring principle. In the use case where an RGB-D sensor is fused with a radar sensor, the first predetermined model becomes:

$$M1: p_{new}(x, y) = \begin{cases} 0.8 & \text{for } RGB-D \ \text{if } (x, y) = (x_b, y_b) \\ P_{fa}^{\frac{1}{1+SNR}} & \text{for radar} \quad \text{if } (x, y) = (x_b, y_b) \\ p_1(x, y) & \text{for } RGB-D \ \text{if } (x, y) \in L_{ab} \end{cases}$$

with the notation introduced above. Similarly, the second predetermined model can be written:

$$M2: p_{new}(x, y) = \begin{cases} p_1(x, y) & \text{for } RGB-D \ \text{if } (x, y) \in C(S) \\ p_2(x, y) & \text{for radar} \quad \text{if } (x, y) \in C(S) \end{cases}$$

Here, the condition $(x, y) \in C(S)$ states that the expressions are valid only for cells lying in the solid angle of incidence S, i.e., in the frustum C(S) for that angle S.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of controlling an industrial robot, which is movable on a substrate, comprising:
   initializing an occupancy grid of cells which each represents a portion of the substrate and is associated with an occupancy probability that some physical object is present in the cell;
   obtaining occupancy-related measurements using a plurality of measuring principles that include sensing an incident electromagnetic wave at an elevated point on the robot, the plurality of measuring principles including RGB-D sensing fused with radar;
   assigning an occupancy probability on the basis of an obtained occupancy-related measurement at an angle of incidence; and
   controlling the industrial robot on the basis of the occupancy grid, wherein the assigning of the occupancy probability includes:
   evaluating whether the measurement indicates that some physical object is present in the angle of incidence,
   selecting a first predetermined model if the evaluation is positive and selecting a second predetermined model if the evaluation is negative, and
   determining a new occupancy probability for cells in the angle of incidence on the basis of the measurement and in accordance with the selected model;
wherein:
   the second predetermined model stipulates that the new occupancy probability in cells in a sensor frustum with a particular solid angle of incidence shall be in a positive relation to a local vertical thickness of the sensor frustum, and
   the first predetermined model is adaptive depending on the measuring principle by which the measurement was obtained, such that the first predetermined model stipulates that:
      the new occupancy probability in cells where the measurement indicates presence of some physical object shall be constant when the measurement is obtained by RGB-D sensing, and
      the new occupancy probability in cells where the measurement indicates presence of some physical object shall be in a negative relation to a noisiness of the radar signal when the measurement is obtained by radar.

2. The method of claim 1, wherein the second model is adaptive in dependence of the at least one measuring principle by which the measurement was obtained.

3. The method of claim 1, wherein the measuring principles include one or more of:
   optical, electromagnetic reflection, electromagnetic scattering, electromagnetic diffraction, lidar, RGB-D sensing, mm-wave radar, or ultra-wideband radar.

4. The method of claim 1, wherein assigning an occupancy probability includes:
   merging the new occupancy probability and a pre-existing occupancy probability for the cell, in particular by applying a recursive rule such as Bayes' rule.

5. The method of claim 4, wherein the merging of the new occupancy probability and a pre-existing occupancy probability for the cell is performed by applying a recursive rule such as Bayes' rule.

6. The method of claim 1, wherein the second predetermined model stipulates that the new occupancy probability shall be linearly related to the local vertical thickness of the sensor frustum.

7. The method of claim 1, wherein:
   the second predetermined model includes applying a pre-correction factor, which maintains the new occupancy probability in off-center cells closer to a neutral probability when the measuring principle includes radar.

8. The method of claim 2, wherein the stone measuring principles include one or more of:
   optical, electromagnetic reflection, electromagnetic scattering, electromagnetic diffraction, lidar, RGB-D sensing, mm-wave radar, or ultra-wideband radar.

9. The method of claim 2, wherein assigning an occupancy probability includes:
   merging the new occupancy probability and a pre-existing occupancy probability for the cell, in particular by applying a recursive rule such as Bayes' rule.

10. A robot controller configured to control at least one industrial robot movable on a substrate, wherein the robot is controlled on the basis of an occupancy grid of cells which each represents a portion of the substrate and is associated with an occupancy probability that some physical object is present in the cell, the robot controller including:

an input interface for receiving occupancy-related measurements obtained by a plurality of measuring principles that include sensing an incident electromagnetic wave at an elevated point on the robot, the plurality of measuring principles including RGB-D sensing fused with radar;

processing circuitry configured to assign an occupancy probability on the basis of an obtained occupancy-related measurement at an angle of incidence, including:

evaluating whether the measurement indicates that some physical object is present in the angle of incidence, selecting a first predetermined model if the evaluation is positive and selecting a second predetermined model if the evaluation is negative, and determining a new occupancy probability for cells in the angle of incidence on the basis of the measurement and in accordance with the selected model; and an output interface for supplying commands to the industrial robot;

wherein:

the second predetermined model stipulates that the new occupancy probability in cells in a sensor frustum with a particular solid angle of incidence shall be in a positive relation to a local vertical thickness of the sensor frustum, and the first predetermined model is adaptive depending on the measuring principle by which the measurement was obtained, such that the first predetermined model stipulates that:

the new occupancy probability in cells where the measurement indicates presence of some physical object shall be constant when the measurement is obtained by RGB-D sensing, and the new occupancy probability in cells where the measurement indicates presence of some physical object shall be in a negative relation to a noisiness of the radar signal when the measurement is obtained by radar.

11. A computer program comprising instructions for causing a robot controller to perform a method including the following steps:

initializing an occupancy grid of cells which each represents a portion of the substrate and is associated with an occupancy probability that some physical object is present in the cell;

obtaining occupancy-related measurements using a plurality of measuring principles that include sensing an incident electromagnetic wave at an elevated point on the robot, the plurality of measuring principles including RGB-D sensing fused with radar;

assigning an occupancy probability on the basis of an obtained occupancy-related measurement at an angle of incidence; and controlling the industrial robot on the basis of the occupancy grid, wherein the assigning of the occupancy probability includes:

evaluating whether the measurement indicates that some physical object is present in the angle of incidence, selecting a first predetermined model if the evaluation is positive and selecting a second predetermined model if the evaluation is negative, and determining a new occupancy probability for cells in the angle of incidence on the basis of the measurement and in accordance with the selected model;

wherein:

the second predetermined model stipulates that the new occupancy probability in cells in a sensor frustum with a particular solid angle of incidence shall be in a positive relation to a local vertical thickness of the sensor frustum, and the first predetermined model is adaptive depending on the measuring principle by which the measurement was obtained, such that the first predetermined model stipulates that:

the new occupancy probability in cells where the measurement indicates presence of some physical object shall be constant when the measurement is obtained RGB-D sensing, and the new occupancy probability in cells where the measurement indicates presence of some physical object shall be in a negative relation to a noisiness of the radar signal when the measurement is obtained by radar.

12. A data carrier storing a computer program for controlling a robot controller using the steps of:

initializing an occupancy grid of cells which each represents a portion of the substrate and is associated with an occupancy probability that some physical object is present in the cell;

obtaining occupancy-related measurements using a plurality of measuring principles that include sensing an incident electromagnetic wave at an elevated point on the robot, the plurality of measuring principles including RGB-D sensing fused with radar;

assigning an occupancy probability on the basis of an obtained occupancy-related measurement at an angle of incidence; and controlling the industrial robot on the basis of the occupancy grid, wherein the assigning of the occupancy probability includes:

evaluating whether the measurement indicates that some physical object is present in the angle of incidence, selecting a first predetermined model if the evaluation is positive and selecting a second predetermined model if the evaluation is negative, and determining a new occupancy probability for cells in the angle of incidence on the basis of the measurement and in accordance with the selected model;

wherein:

the second predetermined model stipulates that the new occupancy probability in cells in a sensor frustum with a particular solid angle of incidence shall be in a positive relation to a local vertical thickness of the sensor frustum, and the first predetermined model is adaptive depending on the measuring principle by which the measurement was obtained, such that the first predetermined model stipulates that:

the new occupancy probability in cells where the measurement indicates presence of some physical object shall be constant when the measurement is obtained by RGB-D sensing, the new occupancy probability in cells where the measurement indicates presence of some physical object shall be in a negative relation to a noisiness of the radar signal when the measurement is obtained by radar.

* * * * *